United States Patent [19]

Heinzl et al.

[11] 4,368,477

[45] Jan. 11, 1983

[54] ARRANGEMENT FOR A PRINTING HEAD IN INK MOSAIC PRINTING DEVICES

[75] Inventors: Joachim Heinzl, Munich; Erich Kattner, Neubiberg; Guenter Rosenstock, Munich, all of Fed. Rep. of Germany

[73] Assignee: Siemens Aktiengesellschaft, Berlin and Munich, Fed. Rep. of Germany

[21] Appl. No.: 262,211

[22] Filed: May 8, 1981

[30] Foreign Application Priority Data

May 23, 1980 [DE] Fed. Rep. of Germany ....... 3019822

[51] Int. Cl.[3] .............................................. G01D 15/18

[52] U.S. Cl. .................................................. 346/140 R

[58] Field of Search .............................. 346/140 R, 75

[56] References Cited

U.S. PATENT DOCUMENTS 3,958,255 5/1976 Chiou et al. .................... 346/140 R
4,112,435 9/1978 Kattner et al. .................. 346/140 R
4,158,847 6/1979 Heinzl et al. .................. 346/140 R
4,189,734 2/1980 Kyser .......................... 346/140 R X

FOREIGN PATENT DOCUMENTS 2015432 9/1979 United Kingdom .

*Primary Examiner*—Joseph W. Hartary

[57] ABSTRACT

A printing head for an ink mosaic printing device is provided with a plurality of diagonally extending ink ducts having downstream ends converging at a printing location on the printing head to form a printing grid pattern. The downstream leading ends of the ducts are formed with wedge-shaped tapered portions, each having a leading edge wall carrying a discharge orifice for ink droplets. By virtue of this construction of the ink ducts, more ink ducts may be used to form the grid pattern and the various discharge orifices may be placed closer to one another to provide higher printing resolution.

8 Claims, 6 Drawing Figures

FIG. 1
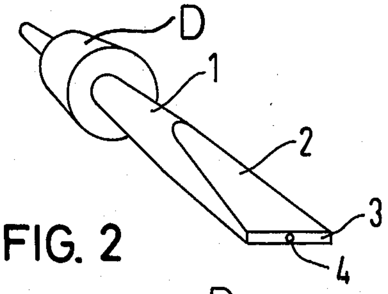
FIG. 2
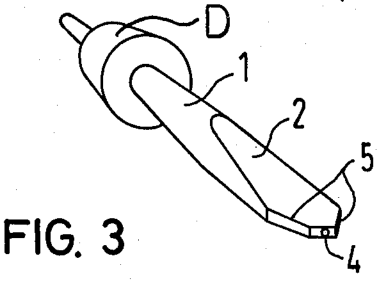
FIG. 3
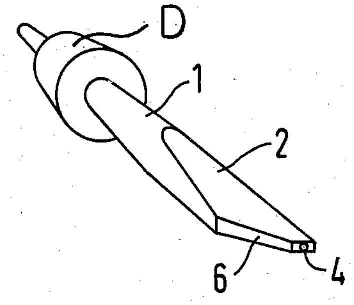
FIG. 4
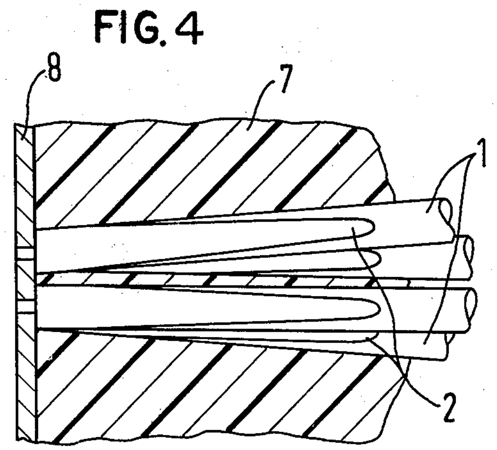
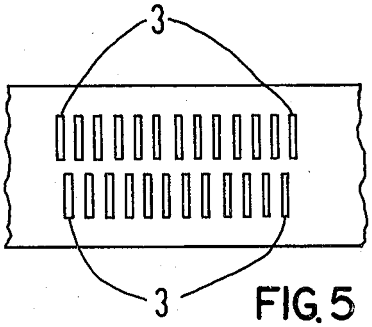
FIG. 5

ARRANGEMENT FOR A PRINTING HEAD IN INK MOSAIC PRINTING DEVICES

BACKGROUND OF THE INVENTION

1. Field of the Invention

The present invention is directed to the arrangement of ink ducts in a printer head for an ink-jet printer unit, wherein the ducts proceed through the printer head in a manner approaching one another in the direction toward the printing location.

2. The Prior Art

An electrically operated ink-jet mosaic printing device in which ink droplets are sprayed from several jets against a recording medium to form a grid shaped character by means of piezoelectric drive elements contained in each of the ink ducts is disclosed in U.S. Pat. No. 4,158,847 (corresponding to German OS No. 2543451). There, the ink ducts extend through the printer head in the form of cylindrical tubes of uniform cross-section between a printing liquid reservoir on one side of the printer head and a printing location on the other side of the printer head where the ink ducts terminate in outlet orifices. A jet plate may also be provided at the printing location of the printer head to provide narrow jet bores which serve as the corresponding outlet orifices for the ink ducts. The piezoelectrical drive elements are individually activated to generate a compression wave in the interior of the ink duct and bring about the ejection of a defined ink droplet. The number of ink ducts and their spacial arrangement at the printing location depends upon the size of a desired printing grid and upon the desired resolution of the ink droplets on the recording medium within the grid. U.S. Pat. No. 4,158,847 concerns the arrangement of ink ducts extending diagonally away from the printing location in a manner free of kinks. This arrangement makes possible, on the one side, to bring spacially close together the downstream ends of the ink ducts in the vicinity of the printing location and, on the other side of the printer head, to provide greater spacing apart of the ink ducts from one another to mount the drive elements for the individual ink ducts with the required control lines. Accordingly, a simple structure of the printing head is attained and its size is reduced to a handy mass.

A drawback associated with the ink duct arrangement described in U.S. Pat. No. 4,158,847 is that the printing quality attained thereby does not always correspond to the desired requirements as a result of the funnelling together of the ink ducts at the printing location or at the jet plate. This results because the discharge orifices of the ink passages cannot be brought as close together to one another as may be desired. Decreasing the space between the downstream ends of the ink ducts at the printing location by the use of thinner ink ducts is not practical, since this approach interferes with flow and technological manufacturing limits. The use of very narrow, long ink ducts causes high flow losses in the ink passages, which leads to the need for increased voltages for operation of the drive elements.

The present invention overcomes this drawback by creating an arrangement which makes possible a narrower separation of the ink ducts in the vicinity of the printing location and thus affords higher ink jet printing resolution, without incurring high flow losses in the ink ducts.

SUMMARY OF THE INVENTION

The downstream ends of ink ducts extending through a printer head of a mosaic ink jet printer device are formed with a wedge-shaped taper convergence leading to an outlet jet orifice for each duct. The tapered ends of the ducts thus afford a closer arrangement of the downstream ends of the ducts relative to one another, such that in the case of ink ducts having a minimum wall thickness the distance between outlet orifices of the ink ducts may be equal to or less than one-half heretofore known separations between ink duct orifices. The ink ducts of the present invention can be arranged such that their orifices lie parallel to the printing location surface of the printer head. The outlet orifices can be arranged to form a single uniform row or at least two rows in parallel spaced apart from one another. The invention makes possible a significant increase in the number of ink ducts and thus also the number of outlet orifices within known printing head dimensions. This has an advantageous effect upon the printing quality, such that roundings and slants may appear as closed lines in grid shaped characters thus produced on a recording medium. Since the number of outlet orifices can be significantly increased, heretofore known minimum toleration limits for printing heights are eliminated, such that the invention makes possible the printing of underlinings and overlinings or accent lengths.

In a further preferred embodiment, the wedge-shaped taperings of the ink ducts can be formed with bite portions at their leading edges to disperse possible air bubble formation at the outlet orifices.

BRIEF DESCRIPTION OF THE DRAWINGS

FIG. 1 is a schematic perspective view of the downstream end of an ink duct provided with a wedge-shaped tapering lead end in accordance with the present invention.

FIG. 2 is a schematic perspective view of an ink duct wedge-shaped tapered end with bite portions applied on both sides in accordance with the present invention.

FIG. 3 is a schematic perspective view of an ink duct wedge-shaped tapered end having a bite portion applied on only one side in accordance with the present invention.

FIG. 4 is a partial, schematic cross-sectional view of a printer head having a jet plate provided along its printing location utilizing wedge-shaped tapering ends for the ink ducts in accordance with the present invention.

FIG. 5 is a partial front view of the printing head of FIG. 4 illustrating an arrangement of leading edges for the ink duct tapered ends into two parallel rows.

DESCRIPTION OF THE PREFERRED EMBODIMENTS

Figure 6:
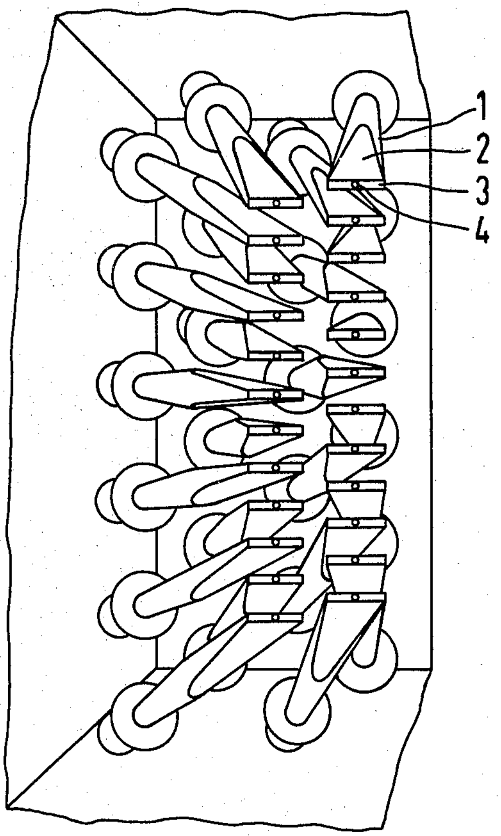
FIG. 6 is a schematic perspective view of a plurality of ink duct wedge-shaped tapering ends in a printer head in accordance with the present invention, such that the ink duct outlet orifices are arranged in two parallel rows.

FIG. 1 illustrates an ink duct 1 generally in the form of a cylindrical tube for extending through a printer head, such as in a mosaic jet printer device. The ink duct 1 communicates at its upstream end (not shown) with an ink supply reservoir and terminates at its downstream end at the printing location surface of the printer head. Positioned intermediately along the ink duct 1 is a drive element D, in the form of a tubular member which cylindrically surrounds a segment of the ink duct and which may be a piezoelectric drive element, such as described in U.S. Pat. No. 4,158,847. The cross-section of the ink duct 1 is maintained generally uniform and as large as possible until close to the printing location. This construction permits flow-losses in the ink duct to remain slight. The downstream lead end of the ink duct 1 is formed with a wedge-shaped tapered segment 2 which terminates with a planar wall leading edge 3. The wedge-shaped tapered segment 2 gives the downstream end of the ink duct a screw-driver form, i.e., tapered above and below a central full width section. The leading edge 3 is formed with a discharge orifice 4 from the ink passage 1.

The cross-sectional width of the ink duct 1 is selected in correspondence to the tools, for example casting needles, which are provided for the production of the ink ducts in the printing head. In accordance with the present invention, a plurality of ink ducts 1 are provided in the printing head terminating with their lead end tapered portions 2 adjacent to one another to form a printing grid. Spacial separation between the corresponding discharge orifices 4 of the various ink ducts 1 is limited only by the relatively reduced cross-section heights of the lead ends and by a minimum wall thickness at the printing location for separately supporting the ink ducts 1 in the printer head.

By providing the wedge-shaped tapering 2 on an ink duct 1, there can result empty spaces, such as between the discharge orifices 4 and a jet plate mounted along the printing location, where air bubbles can collect. These air bubbles can interfere with the functioning of the printing head to the extent that the air bubbles to lead to an attenuation of the pressure wave produced by the drive elements D in the interiors of the ink ducts and negatively influence or prevent the ejection of ink droplets. FIGS. 2 and 3 illustrate further embodiment variations upon the wedge-shaped taper construction shown in FIG. 1 such that air bubbles do not interfere with the ejection of ink droplets from the discharge orifices 4. The variation is comprised of providing a bite portion at the leading edge of the taper which extends along a diagonally convergent plane in the downstream direction toward the leading edge 3. FIG. 2 illustrates an embodiment where biting portions 5 are applied on opposed lateral sides of the discharge orifice 4. FIG. 3 illustrates an embodiment where a bite portion 6 is applied to only one side of the discharge orifice 4. Air bubbles now collecting at the discharge orifice 4 can be directed away from the outlet orifice by virtue of the canting or bite portion area provided at the leading edge of the tapered segment 2.

FIGS. 4–6 illustrate an assembly of 24 ink ducts constructed in the manner of FIG. 1 within a printing head 7. The leading edges 3 of each of the duct end tapers 2 are arranged to be flush with the planar end wall of the printing head 7 at the printing location. The discharge orifices 4 of the ink passages 1 are sealed by a jet plate 8 which has parallel jet bores correspondingly associated with each orifice 4 of the ink duct end tapered portions 2. The ink ducts 1 extend diagonally through the printing head 7 such that their leading edges 3 converge in a grid pattern at the printing location to form two parallel rows of leading edges as shown in FIGS. 5 and 6. The invention is, however, not limited to the grid pattern of duct leading edges illustrated in FIGS. 4–6. It further lies within the framework of the invention to arrange the ink ducts into a single uniform row or in more than two rows. It also is within the contemplation of the present invention to arrange the ink duct such that the leading edges produce various non-linear grid patterns. Due to the reduced thicknesses at the downstream ends of the inventively constructed ink ducts 1, more ink jet discharge orifices can be utilized within a given area for forming a printing grid pattern while still permitting the ink ducts 1 to extend through the printing head at sufficient spacing to accommodate the drive elements D and their attendant control lines.

An economical casting process can be utilized to produce a printing head with ink ducts constructed in accordance with the present invention. In this process, needles can be inserted into the printing head, before actual casting, to form the hollow spaces for the ink ducts. Upper and lower flat surfaces are then ground across the downstream leading end of these needles to form the wedge-shaped taper of the present invention. The flat surfaces converge at a point exterior of the printing location wall of the printing head, which are then cut such that flat leading edge surfaces 3 are formed flush with the printing sidewall of the printing head. By virtue of this process, mechanical stability for the needles in the printing head is assured.

Although various minor modifications may be suggested by those versed in the art, it should be understood that we wish to embody within the scope of the patent warranted hereon all such modifications as reasonably and properly come within the scope of our contribution to the art.

We claim as our invention:

1. An improved printer head for an ink-jet printing device having a plurality of tubular ink ducts extending through said printer head such that downstream ends of said ink ducts converge toward a printing location surface on said printer head, the improvement comprising wherein said downstream ends are each formed with a relatively narrowed leading edge having a discharge orifice, each said leading edge being connected to the remainder of said corresponding duct through a screw-driver form, wedge-shaped tapered segment.

2. The improvement of claim 1, wherein each said leading edge lies flush with said printing location surface of said printer head.

3. The improvement of claim 2, wherein said leading edges are arranged in a linear row.

4. The improvement of claim 2, wherein said leading edges are arranged to form at least two parallel rows.

5. The improvement of claim 1, wherein bite portions are arranged on opposed lateral sides of said discharge orifice in each said tapered segment converging toward said corresponding leading edge for directing air bubbles away from the respective discharge orifice.

6. The improvement of claim 1, wherein a single bite portion is arranged to one side of said discharge orifice in each said tapered segment converging toward said corresponding leading edge for directing air bubbles away from the respective discharge orifice.

7. The improvement of claim 1, wherein a jet plate is provided along said printing location surface having a plurality of jet bores, each corresponding jet bore arranged in front of a corresponding discharge orifice.

8. The improvement of claim 1, wherein the cross-section of each ink duct upstream of said tapered segment is generally uniform.

* * * * *